US005213371A

United States Patent [19]

Bradley

[11] Patent Number: 5,213,371

[45] Date of Patent: May 25, 1993

[54] GREETING CARD/COOKIE DIE COMBINATION

[75] Inventor: Patricia L. Bradley, Brandford, Conn.

[73] Assignee: Bark & Bradley, Inc., Gilmanton Iron Works, N.H.

[21] Appl. No.: 804,689

[22] Filed: Dec. 11, 1991

[51] Int. Cl.[5] .............................................. A22C 17/10

[52] U.S. Cl. ..................................... 283/56; 283/117; 426/87; 426/128; 426/112; 206/232; 206/568

[58] Field of Search ................. 283/117, 56; 281/15.1, 281/51; 40/124.1; 446/147; 426/87, 128, 112, 104, 503, 518; 425/287, 461; 206/232, 568

[56] References Cited

U.S. PATENT DOCUMENTS

| | | | |
|---|---|---|---|
| 2,649,657 | 8/1953 | Shaw | 30/305 |
| 3,307,281 | 3/1967 | Mateo | 426/87 |
| 4,440,298 | 4/1984 | Knight | 206/232 X |
| 4,492,306 | 1/1985 | Cooper et al. | 206/232 X |
| 4,497,126 | 2/1985 | Dejean | 40/124.1 |
| 4,640,413 | 2/1987 | Kaplan et al. | 206/232 |
| 4,828,114 | 5/1989 | Bardeen | 206/232 X |
| 4,870,764 | 10/1989 | Boone | 40/124.1 |
| 4,951,404 | 8/1990 | Lithwick | 40/124.1 |

*Primary Examiner*—Mark Rosenbaum
*Assistant Examiner*—Wilmon Fridie, Jr.
*Attorney, Agent, or Firm*—Howard C. Miskin

[57] ABSTRACT

A greeting card includes a folder having mutually hinged front and rear rectangular panels, a tubular cookie cutter outlined to simulate an object separably attached to the front panel outside face and a cookie dry mix containing envelope separably attached to the front panel inside face. A cookie recipe using the dry mix and other information are printed on opposite faces of the rear panel and decorative material is printed on the front panel outside face. Various fastening means are disclosed for securing the cookie cutter and envelope to the front panel.

9 Claims, 2 Drawing Sheets

GREETING CARD/COOKIE DIE COMBINATION

BACKGROUND OF THE INVENTION

The present invention relates generally to improvements in article dispensing and merchandising devices and it relates particularly to an improved domestic utilitarian device distributing article which is multifunctional.

There are numerous small kitchen utensils which are only occasionally employed and other objects which are on hand are used instead but with drawbacks. An example of such a utensil is a cookie cutter for which a drinking glass or cup is commonly substituted. However, not only is the use of such a substitution frequently undesirable in that the effectiveness of the substitute is lacking but it is limited in its application to the production of only circular discs.

SUMMARY OF THE INVENTION

It is thus a principal object of the present invention to provide an improved article dispensing device and assembly.

Another object of the present invention is to provide an improved multifunctional assembly for the merchandising and dispensing of small kitchen utensils.

Still another object of the present assembly is to provide an improved cookie cutter or die and greeting card device.

A further object of the present invention is to provide an improved device of the above nature characterized by its attractive appearance, low cost, ease and convenience of application and employment and great versatility and adaptability.

The above and other objects of the present invention will become apparent from a reading of the following description taken in conjunction with the accompanying drawings which illustrate preferred embodiments thereof.

A device or assembly in accordance with the present invention includes a folder of a pair of mutually hinged front and rear panels having confronting inside faces and opposite outside faces, a face of the rear panel carrying printed information, a shallow cookie cutter and means detachably securing the cookie cutter to the front panel outside face. Advantageously, detachably secured to the front panel inside face is an envelope containing a cookie dry mix which may be formed into a cookie dough by mixing with a liquid such as water, milk or other liquid ingredients.

The information carried by the rear panel includes a recipe employing the packaged dry mix as well as other information which may include greetings, explanations, directions and other material. The cookie cutter is a cylinder with a peripheral wall formed in the outline of an animal or other object and having a dough cutting bottom edge and a rounded opposite top edge. The cookie cutter is separably secured to the front panel by a bow knotted ribbon attached to the front panel and engaging the cookie cutter, by a pressure sensitive adhesive or the like. The border of the front panel outside face may be suitably decorated.

The improved device is easily housed in a conventional greeting card envelope for convenient mailing and is attractive, useful, convenient and easy to use and of great versatility and adaptability.

DESCRIPTION OF THE PREFERRED EMBODIMENTS

Figure 1:
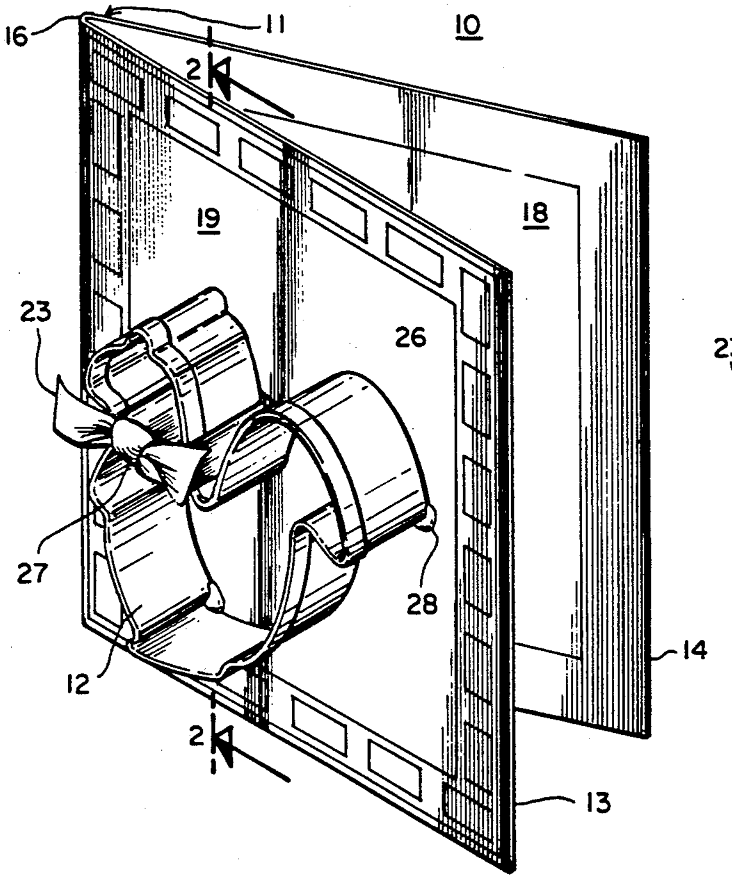
FIG. 1 is a front perspective view of a preferred embodiment of the present invention.
Figure 2:
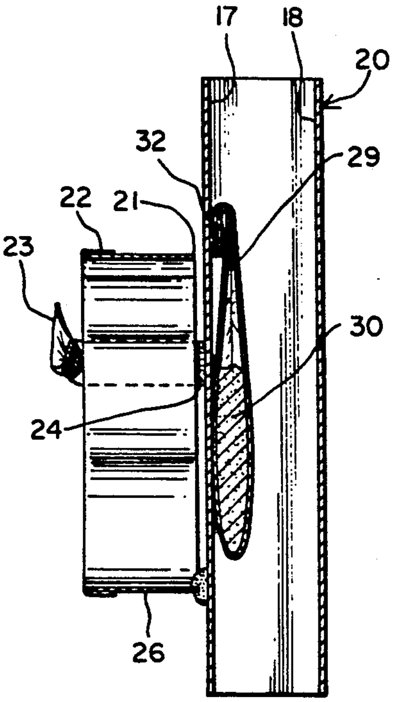
FIG. 2 is a sectional view taken along line 2—2 in FIG. 1.
Figure 3:
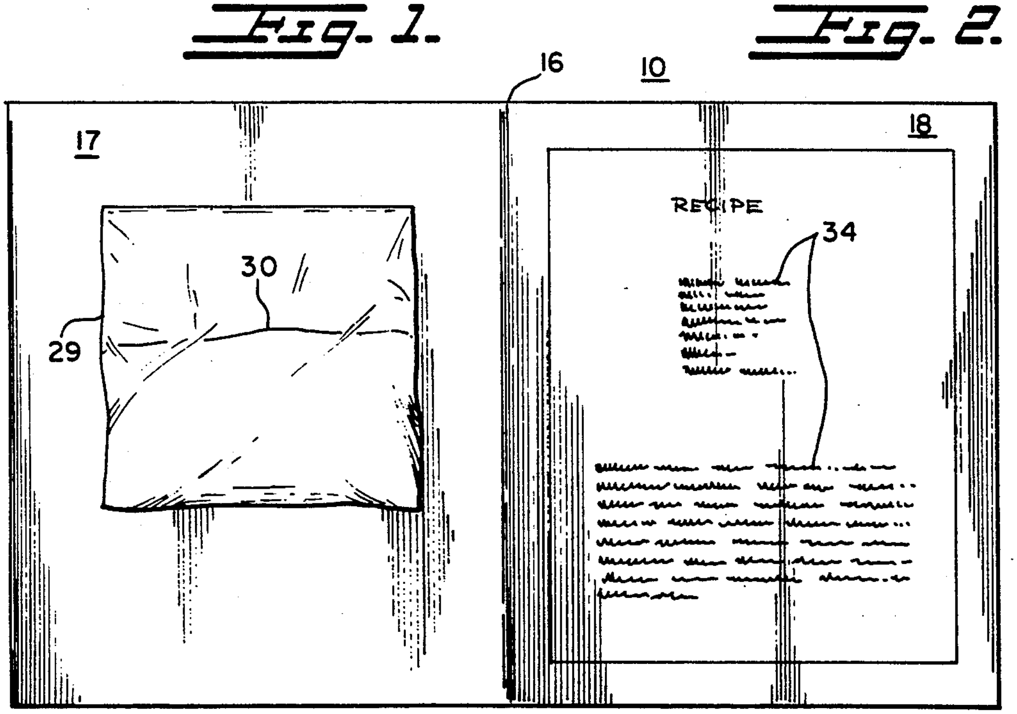
FIG. 3 is an inside plan view of the device shown in an open spread condition.
Figure 4:
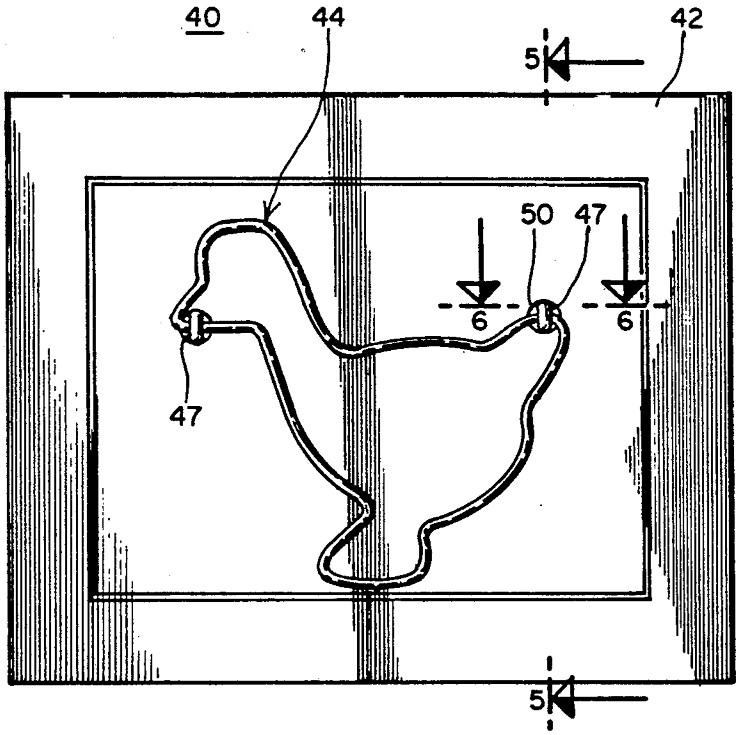
FIG. 4 is an outside plan view of the device shown in an open spread condition.

Referring now to the drawings, particularly FIGS. 1 to 4 thereof which illustrate a preferred embodiment of the present invention, the reference numeral 10 generally designates the improved device or assembly which includes a base folder 11 and a small utensil or cookie cutter 12. Folder 11 is formed of heavy paper, cardboard or other suitable material and includes a pair of integrally formed front and rear rectangular panels 13 and 14 respectively which are mutually hinged along a longitudinal axis defined by a fold line 16. Panels 13 and 14 have confronting inside faces 17 and 18 and opposite outside faces 19 and 20.

Cookie cutter 12 is of tubular cylindrical shape open at opposite end with a peripheral wall 26 whose outline simulates any desired object, for example, a squirrel as shown. The cookie cutter is formed of thin metal and includes an inner cutting edge 21 and a forward or outer border which is reverse folded to form a hem 22 which is rounded at its fold line. A ribbon 23 is secured by adhesive 24 intermediate the ends of ribbon 23 to the front panel outside face 19 and extends therefrom about the outside faces of opposite portions of peripheral wall 16. The ends of ribbon 23 are tied to form a bow knot 27 which extends between opposing portions of peripheral wall 26 to retain cookie cutter 12 to the front panel outside face 19. Additionally, peripherally spaced globs 28 of cement join cutting edge 21 to front face 19.

An envelope 29 contains a powdered cookie dry mix 30 of any desired composition which may be mixed with water or other liquid composition to form a cookie dough. The upper border of envelope 29 is closed and may be sealed and is folded over and detachably secured to front panel inside face 17 by a layer of preferably pressure sensitive adhesive 32.

Information 34 is printed on rear panel inside face 18 including a recipe employing dry mix 30, instructions, explanations, greetings and other information. Additional information and greetings may be printed on the other folder panel faces and the peripheral border of panel front face 19 may be decorated as desired, as at 36, as may other panel face surfaces.

In distributing devices 10, the individual device may be mailed in many conventional greeting card envelopes. In use, the cookie cutter 12 is detached from the folder front panel by opening ribbon knot 27 and pulling the cookie cutter from the front panel. Envelope 29 is detached from the front panel inside face and opened and dry mix 30 removed and used to form a dough as described in recipe instructions 34. The dough is rolled flat and cut with cookie cutter 12 in the usual manner and baked.

Figure 5:
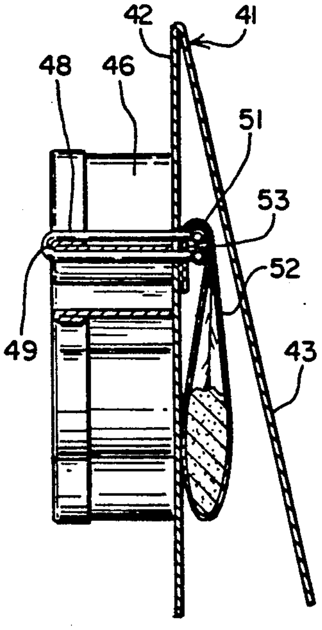
FIG. 5 is a sectional view taken along line 5—5 in FIG. 4.
Figure 6:
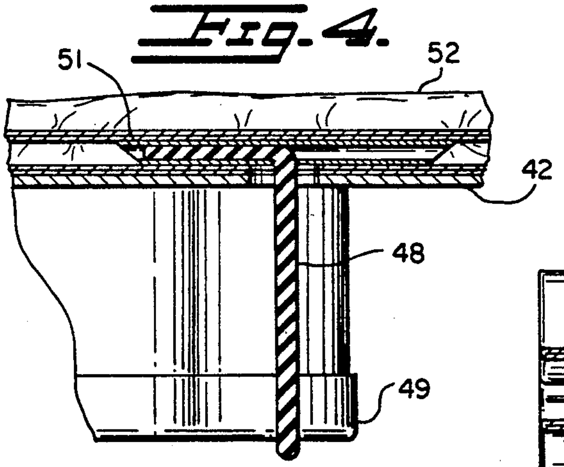
FIG. 6 is an enlarged sectional view taken along line 6—6 in FIG. 4.

The other embodiments of the present invention illustrated in the drawings differ from that described above primarily in the manner in which the cookie cutter and dry mix containing envelope are detachably secured to the folder panel. Thus, in the embodiment of the present invention shown in FIGS. 4 to 6 the modified device includes a folder having front and rear mutually hinged panels 42 and 43 respectively and a cookie cutter 44 differing form cookie cutter 12 only in that the outline of its peripheral wall 46 is that of a chick.

Cookie cutter 44 is detachably secured to the outside face of front panel 42 by a pair of fastening members 47 spaced about wall 46 and linearly laterally separated. Each fastening members 47 includes an elastomeric band or cord 48 extending about a respective portion of peripheral wall 46 passing over and engaging its front rounded edge 49. The free end portions of cord 48 traverse an opening 50 in front panel 42 and are each engaged or clinched by a tubular piercing member 51 through a medial opening in which the cord end passes, piercing member 51 being pointed at opposite ends.

Also provided is a dry mix containing envelope 52 lying along the inside face of front panel 42 and having superimposed upper borders 53 reverse folded and clamped at opposite ends between adjacent piercing members 51 and the inside face of front panel 42 thereby sealing envelope 52 and detachably securing it to front panel 42.

Figure 7:
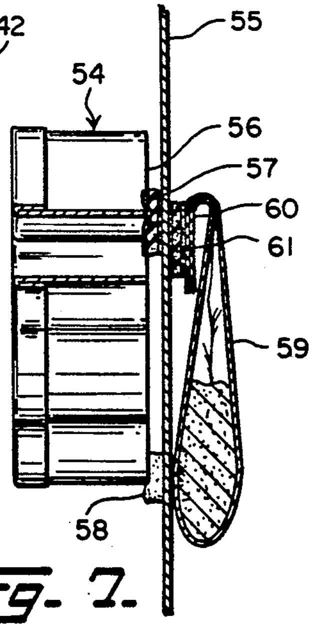
FIG. 7 is a view similar to FIG. 5 of another embodiment of the present invention.

The embodiment of the present invention illustrated in FIG. 7 of the drawings differs from those earlier described only in that the cookie cuter 54 has at least one portion of its cutting edge 56 confronting the outside face of the folder front panel 55 and separably secured to such face by a double faced pressure sensitive adhesive tape 57 sandwiched between the front panel outside face addn the cookie cutter cutting edge. One or more other portions of cutting edge 56 are secured to the front panel outside face by cement globs 58. Further, the dry mix containing envelope 59 has its opening defining upper border 60 mutually sealed and reverse folded and separably joined to the inside face of front panel 55 by a double faced pressure sensitive adhesive tape 61 sandwiched between the inside face of front panel 55 and the confronting face of envelope border 60.

Figure 8:
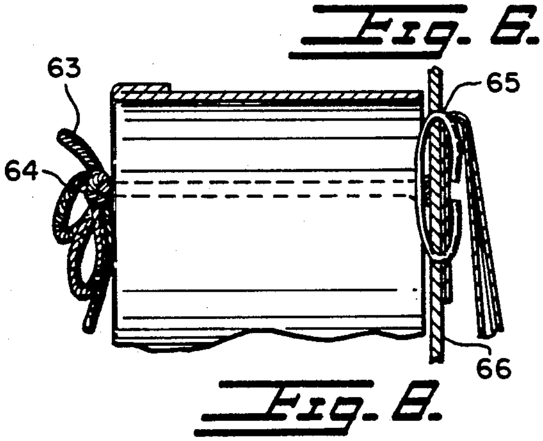
FIG. 8 is a view similar to FIG. 5 of a further embodiment of the present invention.

The embodiment of the inventions illustrated in FIG. 8 substitutes a cord 63 for the ribbon 23 in the first described embodiment, the free end portions of cord 63 being tied into a bow knot 64. The portion of cord 63 proximate the front folder inside face is connected to the front face by a clinched staple 65. The sealed reverse folded border of dry mix containing envelope is secured to the inside face of the front panel 66 by the staple 65.

Except as described above the embodiments of the present invention illustrated in FIGS. 4 to 8 and their use and application are similar to that first described.

While there have been described and illustrated preferred embodiments of the present invention it is apparent that numerous alterations, additions and omissions may be made without departing from the spirit thereof.

I claim:

1. An article dispensing assembly comprising a pair of mutually hinged front and rear panels having confronting inside faces and opposite outside faces, tubular cookie cutter including a peripheral wall having a peripheral end edge overlying said front panel outer face, means attaching said cookie cutter to said front panel outside face, and an envelope including a cookie dry mix attached to said front panel inside face, said rear panel having information printed thereon including a recipe employing said dry mix.

2. The article dispensing assembly of claim 1 wherein said outside face of said front panel has decorative material printed thereon.

3. The article dispensing assembly of claim 1 including further information printed on a face of said rear panel opposite the face thereof containing said recipe.

4. The article dispensing assembly of claim 1 wherein said attaching means includes a plurality of elastomeric bands spaced along and extending about said cookie cutter wall and secured to said front panel.

5. The article dispensing assembly of claim 4 wherein each of said bands extends through said front panel and a wall of said envelope and terminates in piercing members, said envelope wall being sandwiched between said piercing elements and said front panel inside face.

6. The article dispensing assembly of claim 1 wherein said attaching means including double faced pressure sensitive adhesive tape disposed between and secured to said cookie cutter peripheral end edge and said front panel outside face.

7. The article dispensing assembly of claim 6 including a double faced pressure sensitive adhesive tape sandwiched between a face of said envelope and said front panel inside face.

8. An article dispensing assembly comprising a folder including a pair of mutually hinged front and rear panels having confronting inside faces and opposite outside faces, a tubular cookie cutter, a ribbon encircling said cookie cutter and being secured to said front panel outside face, an envelope containing a cookie dry mix attached to said front panel inside face, said rear panel having information printed thereon including a recipe employing said dry mix.

9. The article dispensing assembly of claim 8 including staples clamping said ribbon to said front panel.

* * * * *